United States Patent
Wu

(10) Patent No.: US 9,212,733 B2
(45) Date of Patent: Dec. 15, 2015

(54) LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 416 days.

(21) Appl. No.: 13/766,513

(22) Filed: Feb. 13, 2013

(65) Prior Publication Data

US 2014/0174221 A1    Jun. 26, 2014

(30) Foreign Application Priority Data

Dec. 25, 2012  (TW) .............................. 101225091 U

(51) Int. Cl.
*F16H 25/20* (2006.01)
*H02K 7/06* (2006.01)
*H02K 7/116* (2006.01)

(52) U.S. Cl.
CPC .................. *F16H 25/20* (2013.01); *H02K 7/06* (2013.01); *H02K 7/116* (2013.01); *Y10T 74/18568* (2015.01); *Y10T 74/18576* (2015.01)

(58) Field of Classification Search
CPC ..................... Y10T 74/18576; Y10T 4/18568; F16H 25/20; H02K 7/06; H02K 7/116
See application file for complete search history.

(56) References Cited

U.S. PATENT DOCUMENTS

| 2,918,827 | A | * | 12/1959 | Brown | 74/89.34 |
| 3,038,352 | A | * | 6/1962 | Murphy | 475/2 |
| 3,404,586 | A | * | 10/1968 | Fanstone | 475/296 |
| 3,766,790 | A | * | 10/1973 | Weir | 74/89.26 |
| 3,934,492 | A | * | 1/1976 | Timbs | 475/210 |
| 4,563,908 | A | * | 1/1986 | Shube | 74/2 |
| 4,760,989 | A | * | 8/1988 | Elliott et al. | 251/129.03 |
| 5,355,743 | A | * | 10/1994 | Tesar | 74/490.03 |
| 5,595,089 | A | * | 1/1997 | Watanabe et al. | 74/89.34 |
| 6,158,295 | A | * | 12/2000 | Nielsen | 74/89.38 |
| 8,015,890 | B2 | * | 9/2011 | Christensen et al. | 74/89.38 |

FOREIGN PATENT DOCUMENTS

| TW | M381007 U | 5/2010 |
| TW | M404297 U | 5/2011 |

* cited by examiner

*Primary Examiner* — David M Fenstermacher
(74) *Attorney, Agent, or Firm* — Chun-Ming Shih; HDLS IPR Services

(57) ABSTRACT

A linear actuator includes a housing, a motor, a decelerator and an actuating rod. The housing includes an outer sleeve, a motor sleeve, a connecting sleeve, and at least a motor bolt. The connecting sleeve is connected to one end of the outer sleeve, the motor bolt longitudinally penetrating the motor sleeve and connected to the connecting sleeve. The motor is arranged in the motor sleeve. The decelerator is arranged in the motor sleeve. The decelerator is connected to the motor. The actuating rod is arranged in the outer sleeve. The actuating rod is connected to the decelerator through the motor sleeve, and the actuating rod is driven by the motor through the decelerator. The elements of the linear actuator are thereby firmly assembled by simple structure.

8 Claims, 4 Drawing Sheets

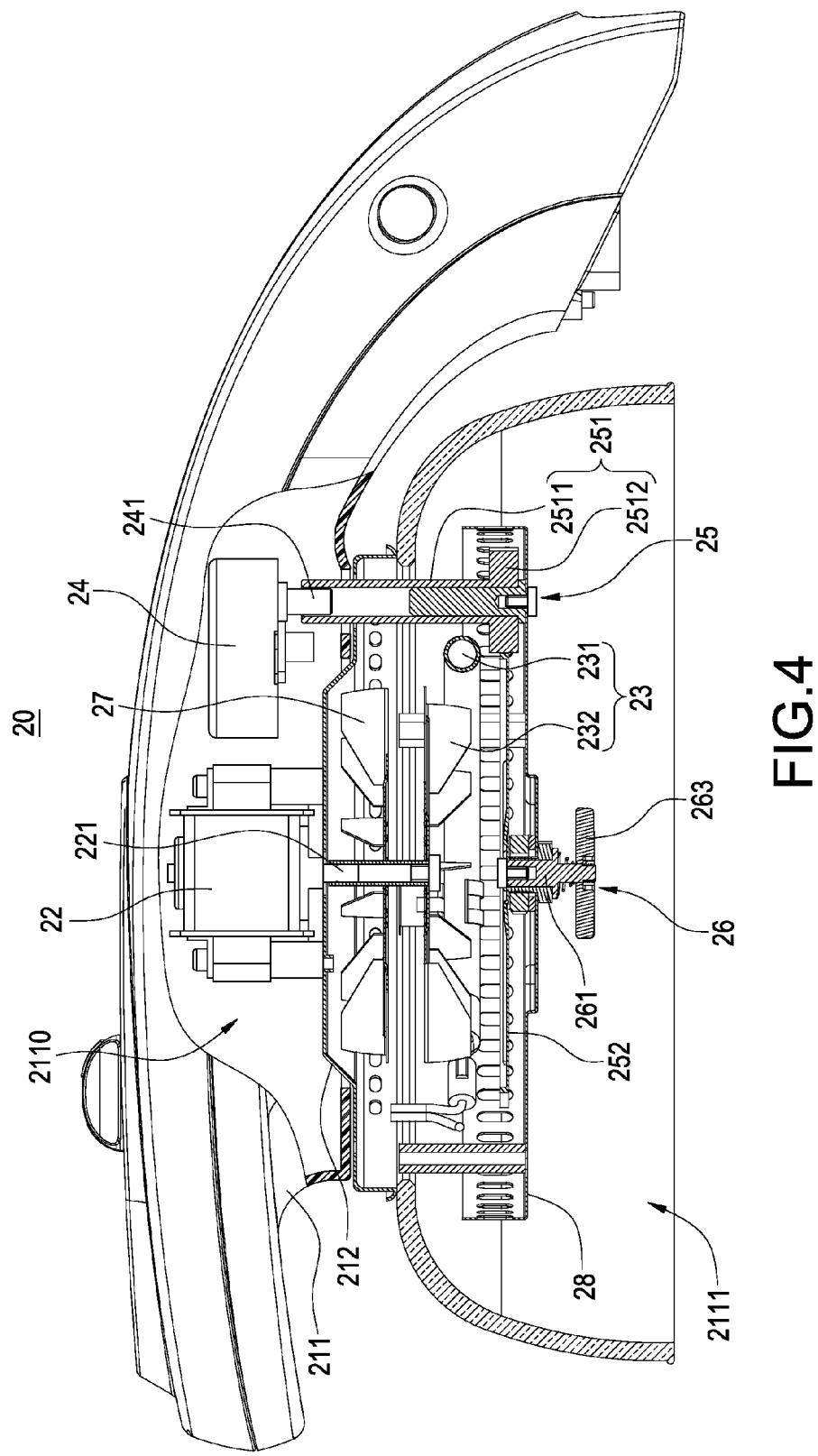

US 9,212,733 B2

LINEAR ACTUATOR

BACKGROUND

1. Field of the Invention

The present disclosure is related to a linear actuator, and in particular to a linear actuator for actuating furniture.

2. Description of Related Art

Linear actuators are commonly used for actuating furniture. The furniture, for example, could be a door or a sickbed. A conventional linear actuator includes an outer tube, an actuating rod arranged in the outer tube. The actuating rod is of tube shape, and a screw rod is arranged in the actuating rod. One end of the actuating rod meshes threads of the screw rod. The linear actuator includes an electric motor. The electric motor is connected to the screw rod to axially rotate the screw rod. When the screw rod is axially rotated, the screw rod drives the actuating rod move axially. For example, on end of the linear actuator is connected to bedstead of a sickbed, and the actuating rod is connected to bed board of the sick to move the bed board.

However, the structures of conventional linear actuators (such as shown in Taiwanese patent TW M404297 or TW M381007) are complex, thus conventional linear actuators are inconvenient for assembling and maintenance.

SUMMARY OF THE INVENTION

The present disclosure provides a linear actuator which could be firmly assembled by simple structure.

The linear actuator of present disclosure includes a housing, a motor, a decelerator and an actuating rod. The housing includes an outer sleeve, a motor sleeve, a connecting sleeve, and at least a motor bolt. The connecting sleeve is connected to one end of the outer sleeve, the motor bolt longitudinally penetrating the motor sleeve and connected to the connecting sleeve. The motor is arranged in the motor sleeve. The decelerator is arranged in the motor sleeve. The decelerator is connected to the motor. The actuating rod) is arranged in the outer sleeve. The actuating rod is connected to the decelerator through the motor sleeve, and the actuating rod is driven by the motor through the decelerator. The elements of the linear actuator are thereby firmly assembled by simple structure.

The outer sleeve, the connecting sleeve and the motor sleeve are coaxially arranged. The connecting sleeve includes an actuating end and a driving end opposing to the actuating end. The connecting sleeve is connected to the outer sleeve by at least a connecting bolt. The connecting sleeve is longitudinally penetrated by the connecting bolt, the connecting bolt inserted into the driving end and reaching the actuating end. A bearing is arranged in the actuating end of the connecting sleeve, and the bearing is connected to the actuating rod. The actuating rod includes a slide tube and an actuating screw rod arranged in the slide tube. The actuating screw rod is connected the decelerator through the connecting sleeve and the bearing. The connecting sleeve includes an actuating end and a driving end opposing to the actuating end. The motor bolt is connected to the driving end. The linear actuator of present disclosure further includes a transition sleeve arranged in the actuator end of the connecting sleeve. The decelerator is arranged in the transition sleeve. The transition sleeve is connected to the decelerator by a bolt. The decelerator includes a planet gear group, and the actuating rod is driven by the motor through the planet gear group.

The linear actuator of the present disclosure could be simply assembled by simple elements. Moreover, the motor bolt longitudinally penetrates the connecting sleeve to firmly connect the motor sleeve and the connecting sleeve. Thus, the linear actuator of the present disclosure could be firmly assembled by simple structure.

BRIEF DESCRIPTION OF DRAWING

FIG. 4 is a sectional view of the linear actuator shown in FIG. 3.

DETAILED DESCRIPTION OF EMBODIMENT

Figure 1:
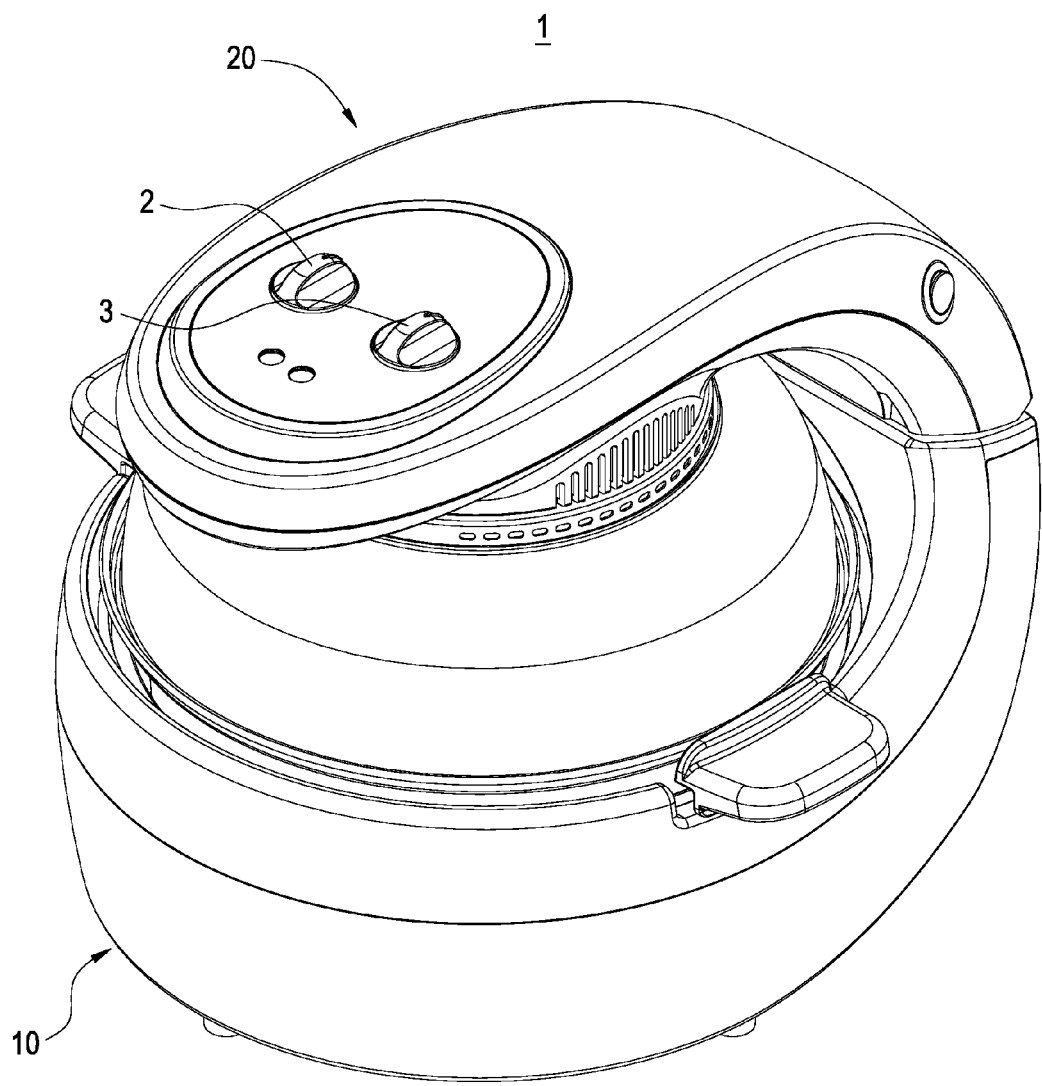
FIG. 1 is an exploded diagram showing the embodiment of the present disclosure.
Figure 2:
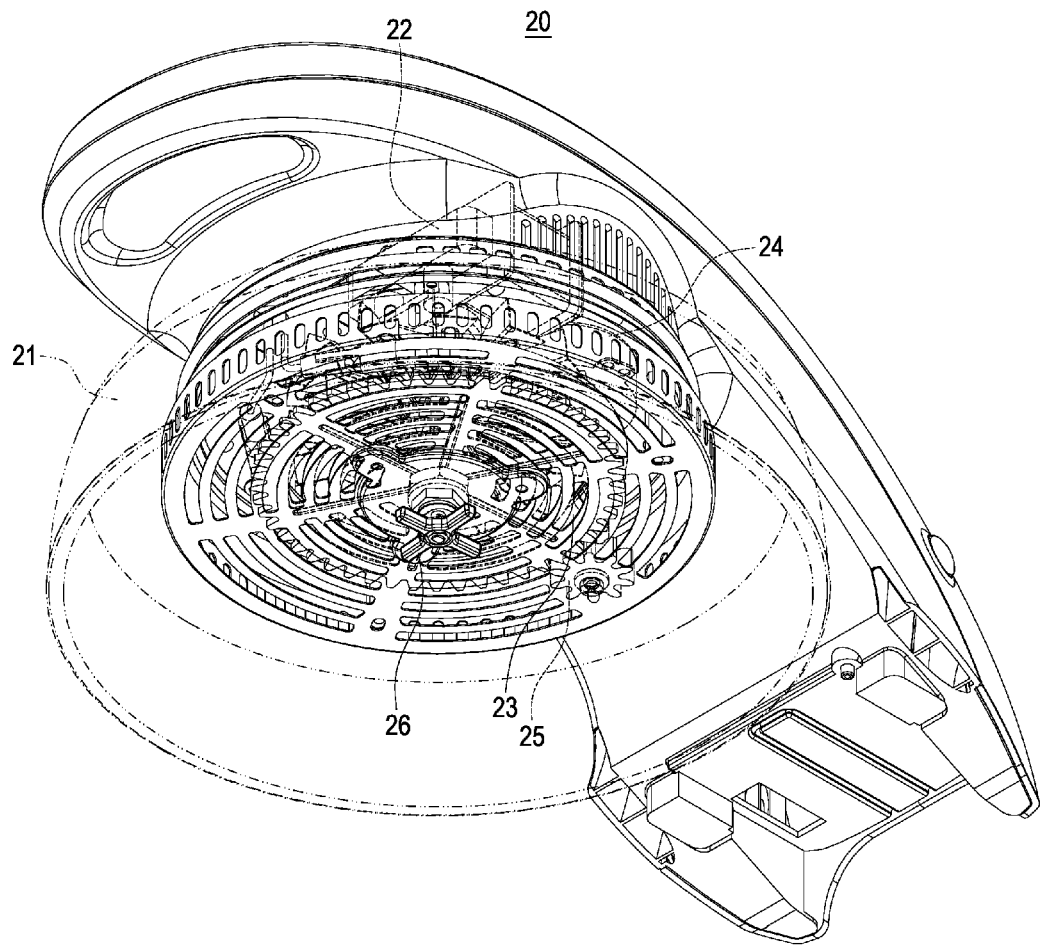
FIG. 2 is another exploded diagram showing the embodiment of the present disclosure.
Figure 3:
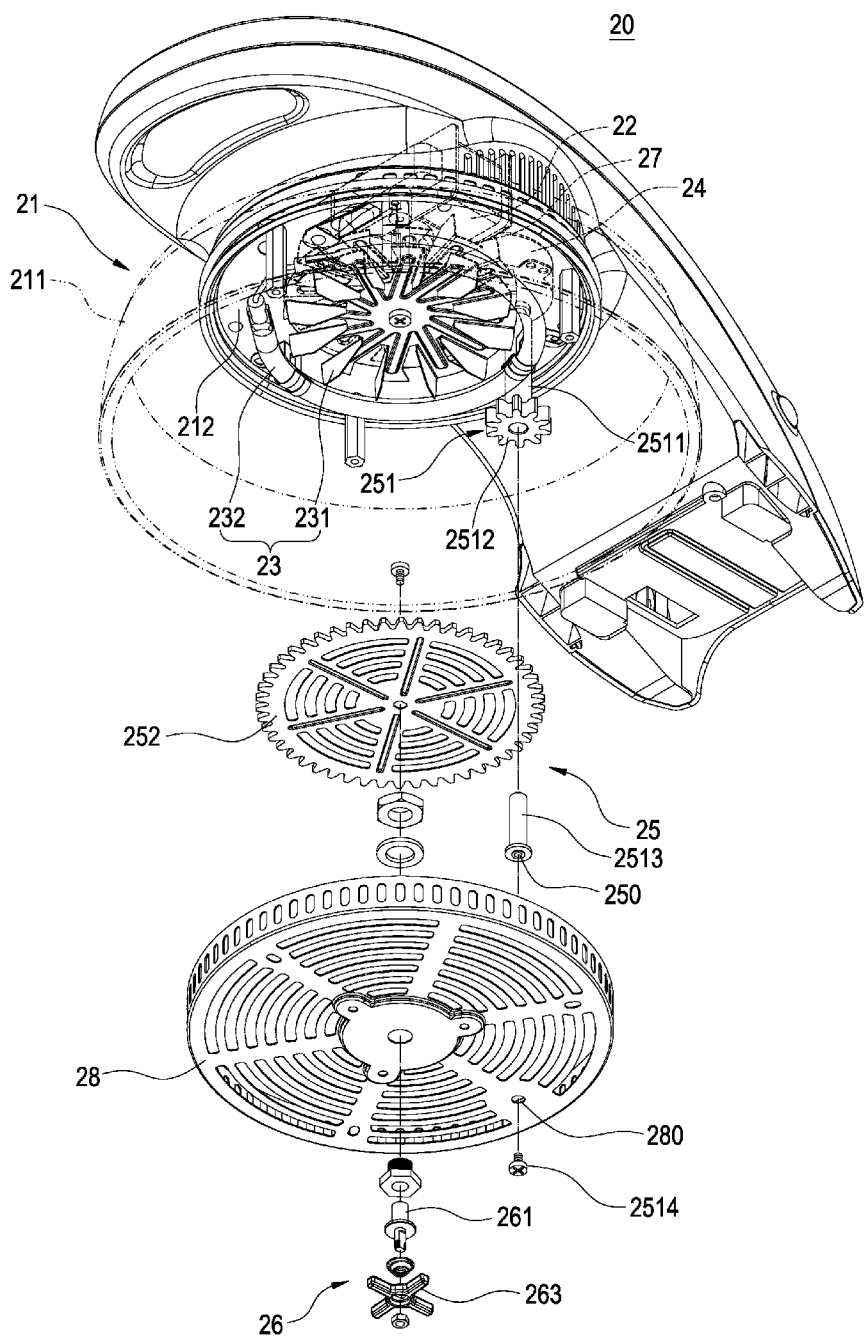
FIG. 3 is a schematic view showing an embodiment of the present disclosure.

Please refer to FIG. 1-4. An embodiment of the present disclosure provides a linear actuator. The linear actuator includes a housing 100, a motor 200, a decelerator 300 and an actuating rod 400.

In the present embodiment, the housing 100 includes an outer sleeve 110, a motor sleeve 120, a connecting sleeve and four motor bolts 140 (the number of the motor bolt 140 is an example rather than a limitation to the present disclosure). The outer sleeve 110, the connecting sleeve 130 and the motor sleeve 120 are coaxially assembled. The connecting sleeve 130 includes an actuating end 131 and a driving end 132 opposing to the actuating end 131. A bearing 500 is arranged in the actuating end 131 of the connecting sleeve 130, and the actuating end 131 of the connecting sleeve 130 is bolted with one end of the outer sleeve 110 by four connecting bolts 133 (the number of the connecting bolt is an example rather than a limitation to the present disclosure). The connecting sleeve 130 is longitudinally penetrated by the connecting bolt 133, the connecting bolt 133 inserted into the driving end 132 and reaching the actuating end 131, and the connecting bolt 133 is further bolted to the outer sleeve 110. A pivot 121 is arranged on one end of the motor sleeve 120, and the driving end 132 of the connecting sleeve 130 is connected to the other end of the motor sleeve 120. Each motor bolt penetrates the pivot 121, further longitudinally penetrates the wall of the motor sleeve 120, and consequently bolts on the driving end 132 of the connecting sleeve 130

The motor 200 and the decelerator 300 are both arranged in the motor sleeve 120. The decelerator 300 includes a planet gear group (the planet gear group is not shown in drawings). The planet gear group is connected to the motor 200 and thereby driven by the motor 200. The decelerator 300 is arranged in a transition sleeve 310. In the present embodiment, the transition sleeve 310 is bolted with the decelerator 300 by four bolts 311 (the number of the bolt is not a limitation to the present disclosure). Moreover, the transition sleeve 310 is inserted in the driving end 132 of the connecting sleeve 130.

The actuating rod 400 is movably inserted in the outer sleeve 110. The actuating rod 400 includes a slide tube 410, and an actuating screw rod 420 is inserted in the slide tube 410. An actuating nut 430 is arranged on one end of the slide tube 410, and a pivoting hole 411 is arranged on the other end of the slide tube 410. The actuating screw rod 420 is screwed into the actuating nut 430. The outer wall of the actuating nut 430 is engaged with the inner wall of the outer sleeve 110. Thereby, the actuating nut 430 is axially movable arranged in the outer sleeve 110. Besides, the actuating nut 430 is axially non-rotatable. The actuating screw rod 420 is inserted in the bearing 500 and further power-transmissibly connected to the planet gear group in the decelerator 300 through the connecting sleeve 130. Thereby, the actuating screw rod 420 could be axially rotated by the motor 200 to drive the slide tube 410 axially slide in the outer sleeve 110.

The linear actuator of the present disclosure is applied to actuate furniture (e.g. bed board of a sickbed or door). The pivot 121 and the pivoting end 411 of the actuating rod 410 are pivoted to two individual elements in the furniture. Thereby, the motor 200 could drive the actuating rod 400 axially slide in the outer sleeve 110.

According to the present disclosure, the motor 200 and the decelerator 300 are located in the outer sleeve 110, and the actuating rod 400 is located in the motor sleeve 120. The outer sleeve 110 and the motor sleeve 120 are connected by the connecting sleeve 130, wherein the outer sleeve 100 is connected to the connecting sleeve 130 by the connecting bolts 133, and the motor sleeve 120 is connected to the connecting sleeve 130 by the motor bolts 140. Thereby, the linear actuator of the present disclosure could be simply assembled by the connecting bolts 133 and the motor bolts 140. Moreover, the motor bolt 140 longitudinally penetrates the connecting sleeve 130 to firmly connect the motor sleeve 120 and the connecting sleeve 130. Therefore, the linear actuator of the present disclosure could be firmly assembled by simple structure.

Although the present disclosure has been described with reference to the foregoing embodiment, it will be understood that the present disclosure is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A linear actuator comprising:
    a housing (100) comprising an outer sleeve (110), a motor sleeve (120), a connecting sleeve (130), and at least a motor bolt (140), wherein the motor sleeve (120), the connecting sleeve (130), and the outer sleeve (100) are connected sequentially, the motor bolt (140) longitudinally penetrating the motor sleeve (120) and connected to the connecting sleeve (130);
    a motor (200) arranged in the motor sleeve (120);
    a decelerator (300) arranged in the motor sleeve (120), wherein the decelerator (300) is connected to the motor (200); and
    an actuating rod (400) arranged in the outer sleeve (110), wherein the actuating rod (400) is axially connected to the decelerator (300) through the motor sleeve (120), and the actuating rod (400) is driven by the motor (200) through the decelerator (300).

2. The linear actuator according to claim 1, wherein the outer sleeve (110), the connecting sleeve (130) and the motor sleeve (120) are coaxially arranged.

3. The linear actuator according to claim 1, wherein the connecting sleeve (130) includes an actuating end (131) and a driving end (132) opposing to the actuating end (131), the connecting sleeve (130) is connected to the outer sleeve (110) by at least a connecting bolt (133), and the connecting sleeve (130) is longitudinally penetrated by the connecting bolt (133), the connecting bolt (133) is inserted into the driving end (132) and reaches the actuating end (131).

4. The linear actuator according to claim 3, wherein a bearing (500) is arranged in the actuating end (131) of the connecting sleeve (130), and the bearing (500) is connected to the actuating rod (400).

5. The linear actuator according to claim 4, wherein the actuating rod (400) comprises a slide tube (410) and an actuating screw rod (420) arranged in the slide tube (410), the actuating screw rod (420) is connected the decelerator (300) through the connecting sleeve (130) and the bearing (500).

6. The linear actuator according to claim 1, wherein the connecting sleeve (130) includes an actuating end (131) and a driving end (132) opposing to the actuating end (131), and the motor bolt (140) is connected to the driving end (132).

7. The linear actuator according to claim 6 further comprising a transition sleeve (310) arranged in the actuator end (131) of the connecting sleeve (130), wherein the decelerator (300) is arranged in the transition sleeve (310).

8. The linear actuator according to claim 7, wherein the transition sleeve (310) is connected to the decelerator (300) by a bolt (311).

\* \* \* \* \*